(12) United States Patent
Itazu et al.

(10) Patent No.: US 7,987,959 B2
(45) Date of Patent: Aug. 2, 2011

(54) ACTUATOR, RANGE CHANGEOVER DEVICE FOR AUTOMATIC TRANSMISSION, AND PARKING DEVICE

(75) Inventors: Naoki Itazu, Nagoya (JP); Yoshinobu Nozaki, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 402 days.

(21) Appl. No.: 12/186,556

(22) Filed: Aug. 6, 2008

(65) Prior Publication Data

US 2009/0038430 A1    Feb. 12, 2009

(30) Foreign Application Priority Data

Aug. 9, 2007   (JP) .................................. 2007-207959

(51) Int. Cl.
*B60W 10/10* (2006.01)
(52) U.S. Cl. ....... 192/219.5; 192/139; 74/411; 74/473.3
(58) Field of Classification Search .................. None
See application file for complete search history.

(56) References Cited

U.S. PATENT DOCUMENTS

| 5,190,503 A * | 3/1993 | Russ ............................. 475/269 |
| 6,877,390 B2 * | 4/2005 | Tsuzuki et al. ................. 74/335 |
| 7,658,123 B2 * | 2/2010 | Hori et al. ....................... 74/335 |
| 2008/0040009 A1 * | 2/2008 | Kamada et al. ................. 701/51 |

FOREIGN PATENT DOCUMENTS

| JP | 05-118436 A | 5/1993 |
| JP | 06-042633 A | 2/1994 |
| JP | 08-247323 A | 9/1996 |
| JP | 2005-198450 A | 7/2005 |
| JP | 2007-056961 A | 3/2007 |

* cited by examiner

*Primary Examiner* — David D Le
*Assistant Examiner* — Jacob S Scott
(74) *Attorney, Agent, or Firm* — Sughrue Mion, PLLC

(57) ABSTRACT

An actuator for a state changeover element that is actuated in a manner interlocking with the tilting of a tilt member is provided. The actuator is equipped with a rotational power generating portion, an output shaft coaxially and integrally rotatably coupled to a tilt spindle of the tilt member to output a rotational power generated by the rotational power generating portion, a casing that covers the actuator and having an opening for exposing one axial end side of the output shaft to an outside. The actuator is further equipped with a rotational angle limiting unit provided between the output shaft and a wall portion of the casing radially facing the output shaft to physically limit a rotational angle of the output shaft. A range changeover device for an automatic transmission equipped with this actuator and a parking device equipped with this actuator are provided.

12 Claims, 10 Drawing Sheets

ACTUATOR, RANGE CHANGEOVER DEVICE FOR AUTOMATIC TRANSMISSION, AND PARKING DEVICE

INCORPORATION BY REFERENCE

The disclosure of Japanese Patent Application No. 2007-207959 filed on Aug. 9, 2007, including the specification, drawings and abstract is incorporated herein by reference in its entirety.

BACKGROUND OF THE INVENTION

1. Field of the Invention

The invention relates to an actuator that drives a state changeover element, which changes state by being pushed/pulled in its axial direction.

2. Description of the Related Art

In general, an automatic transmission for a vehicle is so constructed as to establish a shift range selected from a parking range (P), a reverse range (R), a neutral range (N), a drive range (D), and the like through, for example, the operation of a shift lever installed near the driver seat of the vehicle (e.g., see Japanese Patent Application Publication No. 5-118436 (JP-A-5-118436) and Japanese Patent Application Publication No. 2005-198450 (JP-A-2005-198450)).

In general, such a range changeover device is constructed to change the state of a manual valve as one component of a hydraulic control unit for shift range changeover when the shift lever is operated.

As for a drive system for changing the state of this manual valve, as described in Japanese Patent Application Publication No. 5-118436 (JP-A-5-118436) and Japanese Patent Application Publication No. 2005-198450 (JP-A-2005-198450), a range position selected by the shift lever operated by the driver is detected through the use of a sensor or the like, a tilt member called a detent plate is tilted by a prescribed angle with the aid of an actuator such as an electric motor or the like, and a spool of the manual valve is thereby axially displaced by this detent plate.

When the parking range P is selected by the shift lever, the parking rod of a parking device is axially displaced as the detent plate is tilted. Thus, the output shaft of the automatic transmission is locked to prevent rotation of the output shaft.

The parking rod is axially actuated by tilting the detent plate in response to the operation of putting the shift lever into the parking range P or removing the shift lever from the parking range P.

As for the coupling between a tilt spindle of the detent plate and an output shaft of the actuator, as described in Japanese Patent Application Publication No. 5-118436 (JP-A-5-118436) in particular, a coupling end of the tilt spindle, which is rotatably supported at an appropriate location in an automatic transmission case, and a transverse hole for coupling, which is provided at one end of the output shaft of the actuator, both assume, for example, a generally oval shape. The tilt spindle of the detent plate and the output shaft of the actuator are simply fitted to each other to rotate together. In addition, the tilt spindle of the detent plate and the output shaft of the actuator may also be coupled to each other through a spline fitting.

In the foregoing conventional examples, if a failure in a control system of the actuator results in an overrun, namely, rotation of the output shaft of the actuator and the tilt spindle of the detent plate coupled thereto beyond a target rotational angle, the detent plate tilts more than necessary.

The mechanism described in JP-A-2005-198450 takes into account the fact that the overrun phenomenon, such as an excess over the target rotational angle, occurs due to an inertial force resulting from high-speed rotation of an electric motor, which may be used as the actuator, and describes a technique for preventing the occurrence of overrun by checking the load of the actuator when the actuator is driven and controlling the rotational speed of the actuator.

In JP-A-2005-198450, unlike the invention, there is no technical concept of making the tilt member physically unrotatable even in a situation where the actuator is driven more than necessary as a result of the uncontrollability of the rotational angle of the actuator.

However, if the art described in JP-A-2005-198450 is applied, it seems possible to take measures by incorporating a failsafe program into the control system so as to forcibly stop the driving of the actuator when the control system itself of the actuator recognizes a situation where the actuator is uncontrollable.

In that case, however, when an error arises in the failsafe program of the control system, the overrun of the actuator cannot be prevented. There is a room for improvement in this respect.

SUMMARY OF THE INVENTION

The invention provides an actuator for a state changeover element such as a shift changeover device, a parking device, or the like for a vehicle in which an output shaft of the actuator is stopped from being driven beyond a prescribed rotational angle even when the actuator becomes uncontrollable.

The invention also provides a parking device equipped with the actuator, and a range changeover device equipped with the actuator.

The actuator according to the invention is used for a state changeover element whose state changes over by being rectilinearly pushed/pulled in a manner interlocking with the tilting of a tilt member. This actuator includes a rotational power generating portion, an output shaft coaxially and integrally rotatably coupled to a tilt spindle of the tilt member, through which rotational power generated by the rotational power generating portion is output, and a casing that covers the actuator and includes an opening through which one axial end of the output shaft is exposed. The actuator is characterized in that a rotational angle limiting unit for physically limiting a rotational angle of the output shaft is provided between the output shaft and a wall portion of the casing that radially faces the output shaft.

According to this construction, the rotational angle limiting unit physically limits the rotational angle of the output shaft. Therefore, even if a control abnormality such as the continuous inputting of a drive signal indicating a rotational angle equal to or larger than a target rotational angle to the actuator occurs, the output shaft of the actuator is physically and forcibly stopped.

Thus, the output shaft of the actuator cannot rotate more than necessary. Therefore, no rotational power is transmitted from this output shaft to the state changeover element. As a result, the state changeover element is not forced to move more than necessary.

The rotational angle limiting unit preferably includes a protrusion so provided on one of the output shaft and the wall portion of the casing that radially protrudes toward the other of the output shaft and the wall portion of the casing, and stoppers for normal rotation and reverse rotation, provided on the other of the output shaft and the wall portion of the casing, that abuts against the protrusion as the output shaft rotates.

In the case where the construction of the rotational angle limiting unit is specified as described above, if an attempt is made to rotate the output shaft of the actuator more than necessary, one of the stoppers which corresponds to a rotational direction of the output shaft abuts against the protrusion in a circumferential direction. Thus, the rotation of the output shaft can be physically and forcibly stopped.

The output shaft preferably has a female spline to which the tilt spindle is spline-fitted. The wall portion of the casing preferably is a tubular boss portion having the output shaft disposed in a non-contact manner on an inner diameter side thereof. The rotational angle limiting unit preferably includes a protrusion so provided on an outer periphery of the output shaft on a coupling end side thereof as to protrude radially outward, and stoppers for normal rotation and reverse rotation that are so provided on the tubular boss portion as to come into abutment on the protrusion as the output shaft rotates. Both the stoppers are preferably wall surfaces located on both sides in the circumferential direction respectively in an axial recess provided within a predetermined angular range in the circumferential direction in the tubular boss portion.

When appropriate ones of the components of the actuator are specified and partner components to be provided with the elements constituting the rotational angle limiting unit (the protrusion and both the stoppers) are specified as described above, the mode of limiting the rotational angle of the output shaft is clarified.

Besides, the mode in which the protrusion is provided on the output shaft and both the stoppers are provided on the tubular boss portion of the casing of the actuator, that is, the mode in which the protrusion and both the stoppers are provided at a most downstream position of a power transmission path extending from the rotational power generating portion of the actuator to the output shaft thereof is adopted. Therefore, when a play of the rotational angle inherent in the power transmission path is grasped in advance and the target rotational angle of the output shaft is set in consideration of this play, the transmission of the play from the output shaft to the tilt spindle is thereby prevented. Thus, an advantage is gained in reducing the dispersion of the range of the rotational angle limited by the rotational angle limiting unit.

The state changeover element as described above can be designed as, for example, a range changeover device, a parking device, or the like for an automatic transmission.

The range changeover device for the automatic transmission according to the invention includes a shift operation unit for selecting a shift range through manual operation, a shift range position detector that detects the shift range position selected by the shift operation unit, and a drive unit that changes a state of a manual valve as one component of a hydraulic control unit for shift range changeover, with which the automatic transmission is equipped, on the basis of a detection output from the shift range position detector. The range changeover device is characterized in that the drive unit includes a tilt member that is rotatably supported and is rotated in an appropriate direction to change the state of the manual valve, and the actuator that rotates a tilt spindle of the tilt member in an appropriate direction, and that the actuator is constructed as described above.

In this case, the actuator of the range changeover device is constructed as described above. Therefore, there is no apprehension, for example, that the range changeover device may be forced to move more than necessary in changing over the state of the manual valve. In consequence, an improvement in reliability can be achieved.

The parking device according to the invention includes a parking gear fixed to the exterior of an output shaft of a transmission, a parking lock pawl that has a pawl tooth that engages with the parking gear and is displaced between a locked position in which the parking gear is unrotatable, when the parking lock pawl approaches the parking gear to engage the pawl tooth with the parking gear, and an unlocked position, in which the parking gear is rotatable, when the parking lock pawl moves away from the parking gear to disengage the pawl tooth from the parking gear, a parking rod that is actuated to engage and disengage the parking lock pawl with the parking gear, and a drive unit that actuates the parking rod. The parking device is characterized in that the drive unit includes a tilt member that is tiltably supported to actuate the parking rod, and an actuator that rotates a tilt spindle of this tilt member in an appropriate direction, and that the actuator is constructed as described above.

In this case, the actuator of the parking device is constructed as described above. Therefore, there is no apprehension, for example, that the parking device may be forced to move more than necessary in performing locking operation or unlocking operation. In consequence, an improvement in reliability can be achieved.

In the actuator according to the invention, even if the control system thereof fails, the rotational angle of the output shaft of the actuator can be limited. Therefore, there is no apprehension, for example, that the state changeover element as a target to be driven by the actuator according to the invention may be forced to move more than necessary. In consequence, a contribution to an improvement in reliability can be made.

In the range changeover device for the automatic transmission according to the invention, the actuator thereof is constructed as described above. Therefore, there is no apprehension, for example, that the range changeover device may be forced to move more than necessary in changing over the state of the manual valve. In consequence, a contribution to an improvement in reliability can be made.

In the parking device according to the invention, the actuator thereof is constructed as described above. Therefore, there is no apprehension, for example, that the parking device may be forced to move more than necessary in performing locking operation or unlocking operation. In consequence, a contribution to an improvement in reliability can be made.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE PREFERRED EMBODIMENTS

Figure 1:
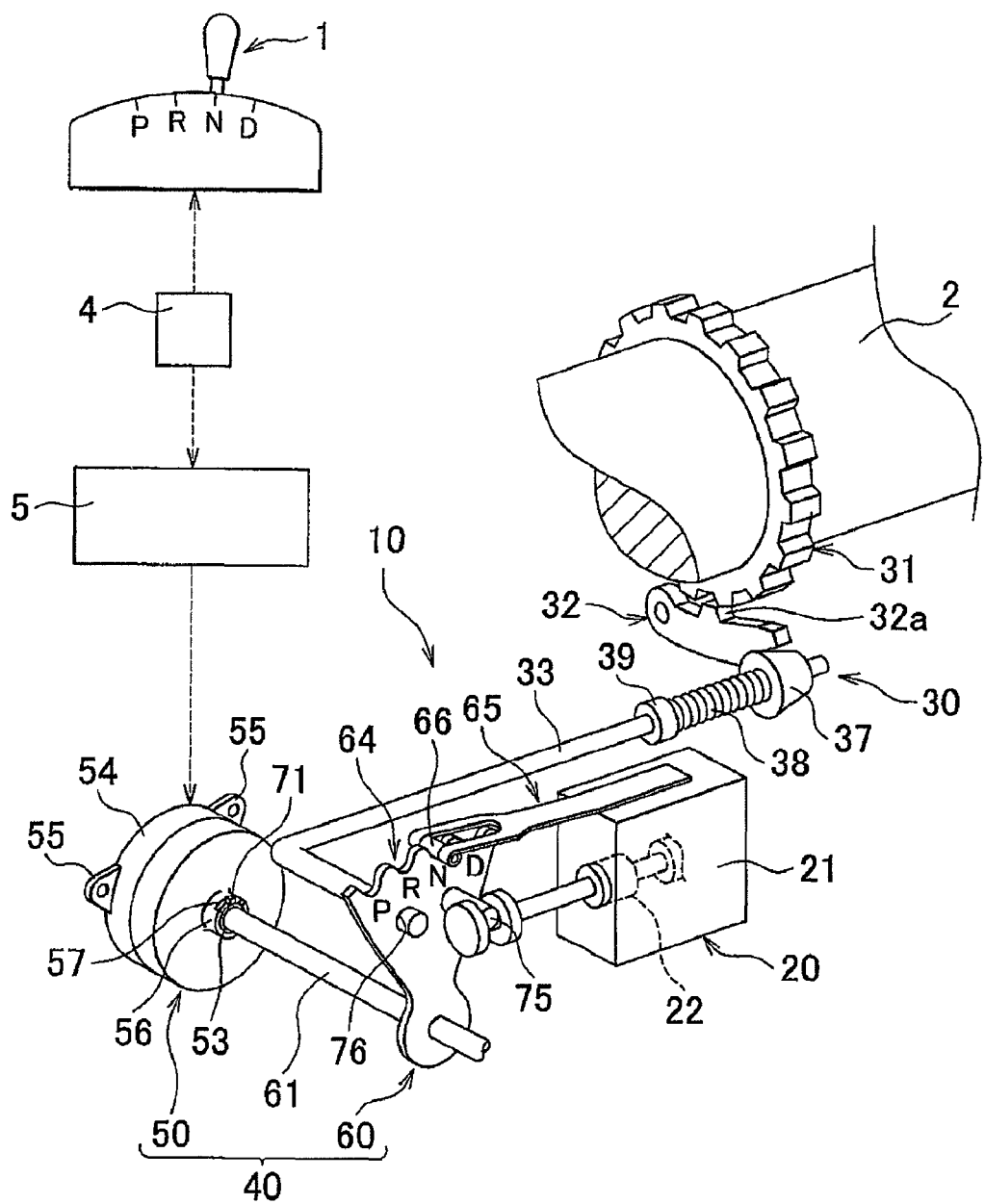
FIG. 1 is a perspective view showing the overall construction of one embodiment of a range changeover device according to the invention.

FIGS. 1 to 9 show one embodiment of a range changeover device for an automatic transmission according to the invention. Prior to the description of a region to which the features of the invention are applied, the overall structure of the range changeover device will be described with reference to FIGS. 1 to 3.

In an automatic transmission mounted on a vehicle such as, for example, an automobile, a parking range P, a reverse range R, a neutral range N, a drive range D, may be established by using, for example, a shift range selected by a shift lever 1, which serves as a shift operation unit.

A range changeover device 10 according to this embodiment of the invention is an example of a shift-by-wire type range changeover device. The range changeover device 10 is mainly composed of a manual valve 20 for changing the range of the automatic transmission, a parking device 30, and a drive unit 40.

The manual valve 20 is one component of a hydraulic control unit that controls the engagement of various brakes and clutches that are provided in a gear shift mechanism portion of an automatic transmission (not shown).

The hydraulic control unit, which is generally known, includes a plurality of linear solenoid valves for controlling the engagement of the various brakes and clutches in addition to the manual valve 20. When the shift lever 1 is operated, the manual valve 20 is actuated to the change channels that supply working fluid to the respective linear solenoid valves. A range corresponding to each of the operations is thereby established.

The manual valve 20 may be a conventional spool valve, and is mainly composed of a valve body 21 and a spool 22.

The valve body 21 may be fixed to an automatic transmission case at an appropriate location, and has an oil supply port and an oil discharge port. The spool 22 is accommodated in the valve body 21 to allow axial displacement of the spool 22.

The parking device 30 changes between a locked state, where the output shaft 2 of the automatic transmission is unrotatable, and an unlocked state, where the output shaft 2 is rotatable. The parking device 30 is mainly composed of a parking gear 31, a parking lock pawl 32, and a parking rod 33.

The parking gear 31 is fixed to the outer circumference of the output shaft 2, and is integrally rotatable with the output shaft 2.

The parking lock pawl 32 is disposed near the parking gear 31 with one end side of the parking lock pawl 32 serving as a fulcrum. A pawl tooth 32a, which may be engaged with or disengaged from a space between consecutive teeth of the parking gear 31, is provided at an appropriate position in the longitudinal direction of the parking lot pawl 32.

The parking rod 33 is disposed to permit displacement along its axis, and is substantially parallel to the output shaft 2 of the automatic transmission.

As shown in FIG. 1, the front end of the parking rod 33 is coupled to a detent plate 60 of the drive unit 40, which will be described below. The parking rod 33 is actuated through the tilting operation of the detent plate 60.

A tapered cone 37 that tilts the parking lock pawl 32 is provided at the rear end of the parking rod 33. The tapered cone 37 is pressed toward the parking gear 31 by a coil spring 38. The coil spring 38 is fitted on the exterior of the parking rod 33, and is received at one end of the parking rod 33 by a retaining ring 39 that is securely engaged with the parking rod 33.

The drive unit 40 actuates the manual valve 20 and the parking device 30 to establish the shift range (P, R, N, D) selected by the shift lever 1. The drive unit 40 is mainly composed of an actuator 50 and the detent plate 60, which serves as a tilt member.

Figure 3:
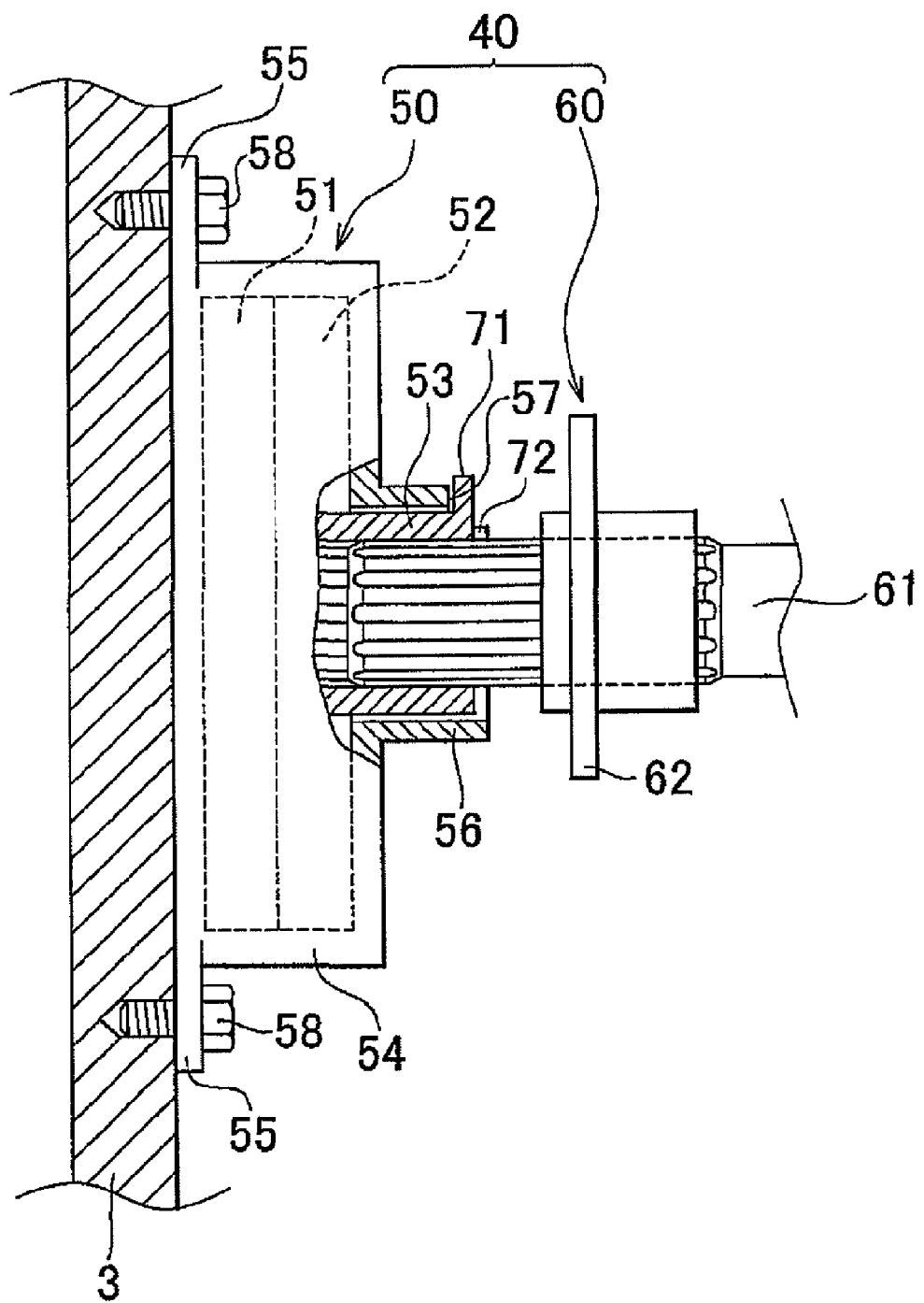
FIG. 3 is a lateral view showing the cross-section of a coupling region between an output shaft of an actuator of FIG. 1 and a tilt spindle of a detent plate of FIG. 1.

Although not shown in detail, the actuator 50 is constructed with a casing 54 that accommodates a rotational power generating device 51 such as an electric motor or the like, a speed reduction mechanism 52, and an output shaft 53, as shown in, for example, FIG. 3.

The actuator 50 is bolted to an automatic transmission case, using bolts 58. The bolts are fitted through flange portions 55, which are provided along the outer circumferential edge of the casing 54.

Although not shown in detail, the speed reduction mechanism 52 may employ a cycloid gear, a gear mechanism constructed of a plurality of combined gears, a planetary gear mechanism, or the like. An input gear (not shown) of the speed reduction gear 52 is coupled to a rotor shaft (not shown) of the rotational power generating portion 51. The output shaft 53 is integrally provided at a rotational center of a final reduction gear (not shown) of the speed reduction mechanism 52.

A tubular boss portion 56 is provided in a predetermined region of the casing 54. The output shaft 53, does not contact the tubular boss portion 56. The output shaft 53 is exposed to the outside from an opening of the tubular boss portion 56.

The detent plate 60 transmits the output of the actuator 50 to the spool 22 of the manual valve 20 and the parking rod 33 of the parking device 30.

The detent plate 60 has a fan-shaped contour. A tilt spindle 61, which is separate from the detent plate 60, is integrally rotatably fixed in a penetrating manner to an area that serves as a tilt center of the detent plate 60.

Figure 4:
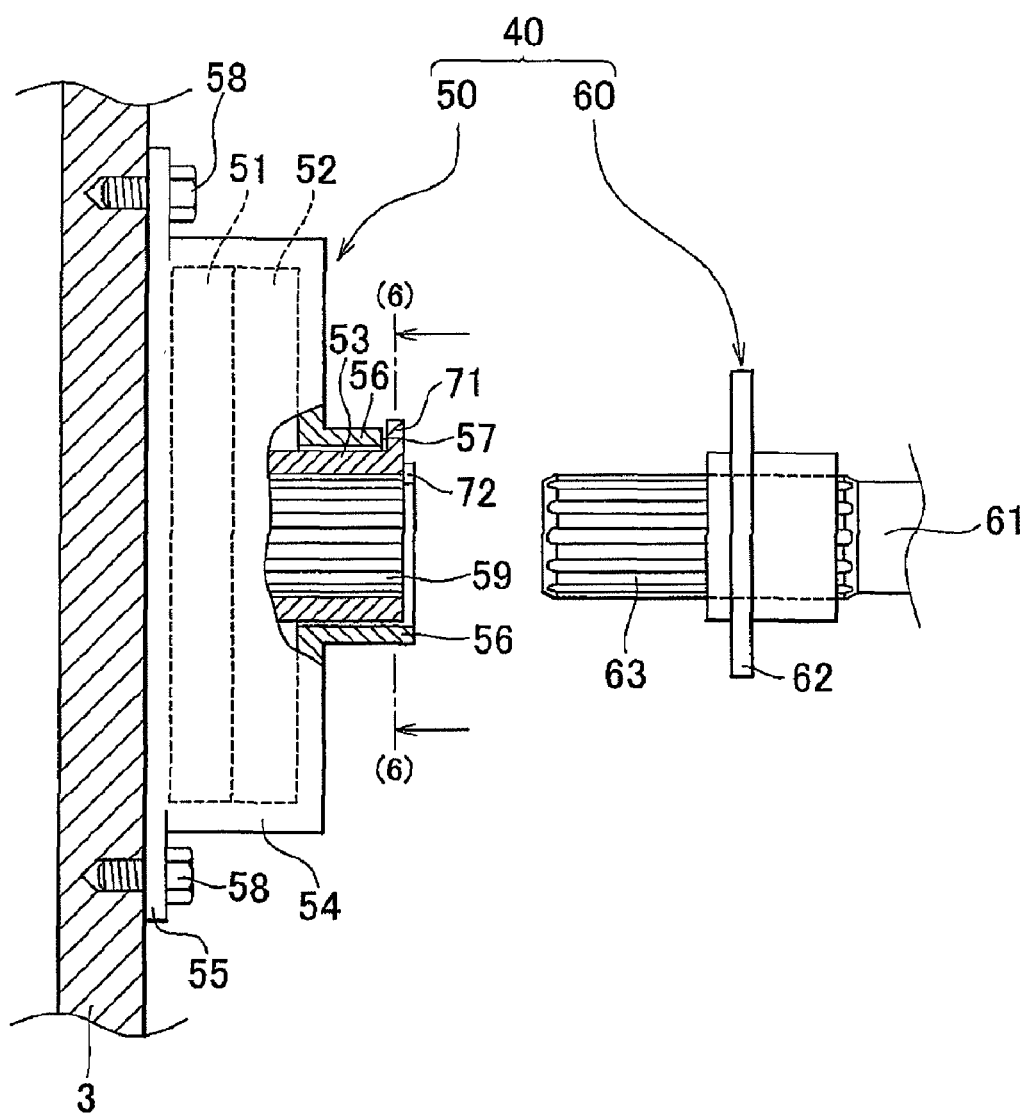
FIG. 4 is a lateral view showing the tilt spindle when disengaged in FIG. 3.
Figure 5:
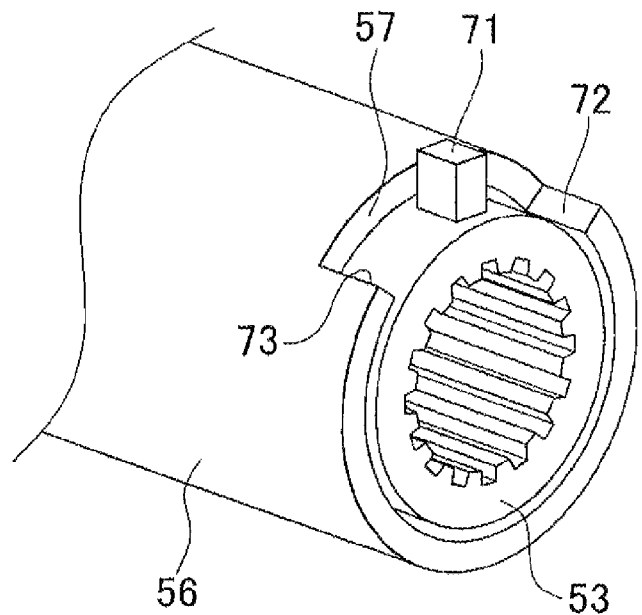
FIG. 5 is a perspective view showing the output shaft of the actuator of FIG. 4 and a surrounding area thereof on an enlarged scale.

More specifically, as shown in, for example, FIG. 4, the detent plate 60 is coupled to the tilt spindle 61 via a boss portion 62 on a tilt fulcrum region of the detent plate 60, providing a female spline 59 along an inner hole of this boss portion 62, and spline-fitting the boss portion 62 to a male spline 63 of the tilt spindle 61.

Thus, when the tilt spindle 61 is rotated, the detent plate 60 rotates (or tilts) together with the tilt spindle. Thus, the detent plate 60 may be formed integrally with the tilt spindle 61.

The tilt spindle 61 is coaxially and integrally rotatably coupled at one axial end thereof to the output shaft 53 of the actuator 50. Although not shown, the opposite end of tilt spindle 61 is supported by, for example, the automatic transmission case 3 or the like.

The tilt spindle 61 of the detent plate 60 and the output shaft 53 of the actuator 50 may be coupled to each other through spline fitting. That is, the male spline 63 is provided on an outer periphery of the tilt spindle 61 on one end side thereof, and the female spline 59 is provided along an inner peripheral face of a transverse hole region on an inner diameter side of the output shaft 53 of the actuator 50. Thus, when the tilt spindle 61 is rotated in either direction, namely, a normal direction or a reverse direction, by a predetermined angle by the actuator 50, the detent plate 60 is also rotated.

The front end of the spool 22 of the manual valve 20 and the front end of the parking rod 33 of the parking device 30 are coupled to the detent plate 60 at a predetermined position thereof. Thus, when the detent plate 60 is rotated, both the spool 22 of and the parking rod 33 are axially displaced.

The spool 22 may be coupled to the detent plate 60 using a pin 75 that is mounted parallel to the tilt spindle 61 at a predetermined position of the detent plate 60. The pin 75 may be interposed between two circular plates provided on outer end regions of the spool 22 respectively.

The parking rod 33 may be coupled to the detent plate 60 by bending the tip portion of the parking rod 33 and inserting it into a through-hole 76 provided in the detent plate 60 on one longitudinal end side thereof. The parking rod 33 may be held in place by fitting a snap ring (not shown), an engagement pin (not shown), or the like to the tip portion; alternatively, the tip portion is then plastically deformed. Thus, the parking rod 33 is retentively fixed to the detent plate 60.

This detent plate 60 is tilted in, for example, four stages corresponding to the respective shift ranges (e.g., the parking range P, the reverse range R, the neutral range N, and the drive range D) selected by the shift lever 1. The spool 22 of the manual valve 20 slides in the axial direction in four steps in accordance with the tilting position of the detent plate 60.

For this purpose, an upper end of the detent plate 60 is provided with a waveform portion 64 assuming the shape of, for example, a sinusoidal wave.

Figure 2:
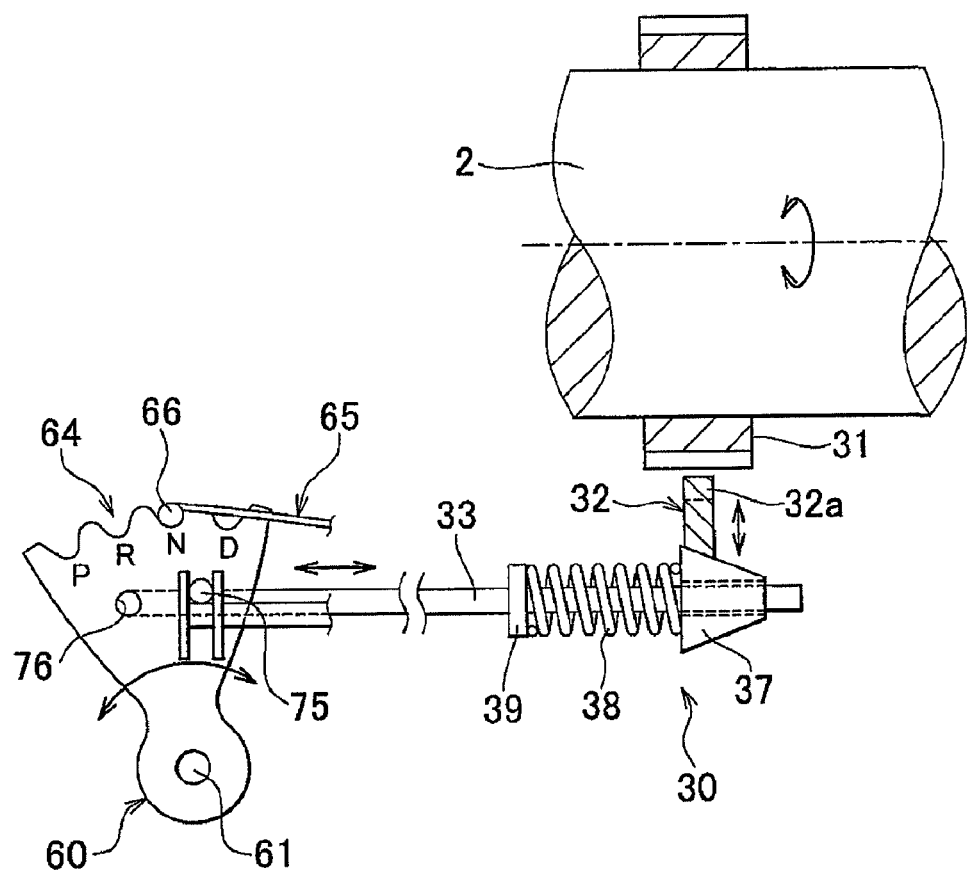
FIG. 2 is a lateral view of the range changeover device of FIG. 1, showing a neutral range N.

The waveform portion 64 has four troughs, that is, troughs equal in number to the number of shift ranges (the parking range P, the reverse range R, the neutral range N, and the drive range D) in four respective stages of the shift lever 1. As shown in FIG. 2, the detent plate 60 is marked, close to the four troughs thereof, with "P, R, N, D".

A detent spring 65 holds tilt postures of the detent plate 60 in the four respective stages. The detent spring may be formed using a leaf spring exhibiting elasticity, and has a roller 66 that is supported at a bifurcated region at one tip of the detent spring. The roller 66 may engage any one of the troughs of the waveform portion 64 of the detent plate 60.

In this embodiment of the invention, one end of the detent spring 65 is fixed to the valve body 21 of the manual valve 20.

Next, the operation of the range changeover device 10 constructed as described above will be described in detail.

First, during a normal gear shift processing, when a the shift lever 1 is operated to select one of the parking range (P), the reverse range (R), the neutral range (N), the drive range (D), and the like of the automatic transmission, a range position sensor 4 detects the selected range position.

An electronic control unit (ECU) 5 recognizes the selected range position on the basis of the output from this range position sensor 4. The electronic control unit 5 drives the output shaft 53 of the actuator 50 such that the output shaft 53 rotates normally or reversely, and rotates (tilts) the tilt spindle 61 and the detent plate 60 by a prescribed angle.

Then, the detent spring 65 moves over one of mountains of the waveform portion 64 of the detent plate 60 and is thereby temporarily elastically deformed, and the roller 66 engages with one of the adjacent troughs of the waveform portion 64. Thus, the detent plate 60 is maintained in position by the detent spring 65.

Due to the tilting of this detent plate 60, the spool 22 of the manual valve 20 slides along its axial direction, and the manual valve 20 is changed over to the selected one of the range positions "P", "R", "N", and "D". Thus, the hydraulic control unit (not shown) is appropriately driven to establish an appropriate gear shift stage in the automatic transmission.

When the parking range P is selected, the manual valve 20 changes over to the "P" position, and the parking rod 33 of the parking device 30 is axially slid to engage the pawl tooth 32a of the parking lock pawl 32 with the parking gear 31. Thus, the output shaft 2 of the automatic transmission is locked to prevent rotation.

When any other range is selected from the parking range P, the electronic control unit 5 drives the actuator 50 to rotate the tilt spindle 61 in the reverse rotational direction through a predetermined angle. Thus, the detent plate 60 is tilted in the same direction as described above. In response to the tilting of the detent plate 60, the parking rod 33 and the tapered cone 37 axially slide in a direction opposite from the direction described above, and a force exerted by the tapered cone 37 to push up the parking lock pawl 32 is canceled. Thus, the parking lock pawl 32 moves downward, and the pawl tooth 32a thereof is disengaged from the space between adjacent teeth of the parking gear 31. Therefore, the output shaft 2 is unlocked and may rotate. At the same time, the spool 22 of the manual valve 20 is displaced to a target position to create appropriate channels for supplying working fluid in the hydraulic control unit.

Now, the region to which the features of the invention are applied will be described in detail with reference to FIGS. 3 to 9.

In short, the actuator 50 of the range changeover device 10 is provided, between the output shaft 53 and the tubular boss portion 56 of the casing 54, with a rotational angle limiting unit (no reference symbol assigned) that physically limits the rotational angle of the output shaft 53.

The rotational angle limiting device includes a protrusion 71 provided on the output shaft 53 side, and stoppers 72 and 73 for normal rotation and reverse rotation that are provided on the tubular boss portion 56 side.

The protrusion 71 is integrally provided and protrudes radially outward at one location on an outer periphery of the output shaft 53 on an outer end side of the output shaft 53.

Both the stoppers 72 and 73 are wall surfaces located respectively on opposite ends of an axial recess 57, which is provided within a predetermined angular range in the tubular boss potion 56 in the circumferential direction of the tip side of the tubular boss portion 56. That is, the tubular boss portion 56 may also be considered a wall portion. The axial recess 57 is in the shape of "U" when viewed from the outer diameter side.

The circumferential width of the axial recess 57 may be set as appropriate. The shape and material of the protrusion 71 and the axial recess 57 are appropriately set in consideration of an impact load caused through repeated abutment, repetition fatigue strength, and the like. The rotational speed of the output shaft 53 limited by the rotational angle limiting unit is set on the basis of the tilt angle of the detent plate 60 from the parking range P to the drive range D.

Figure 7:
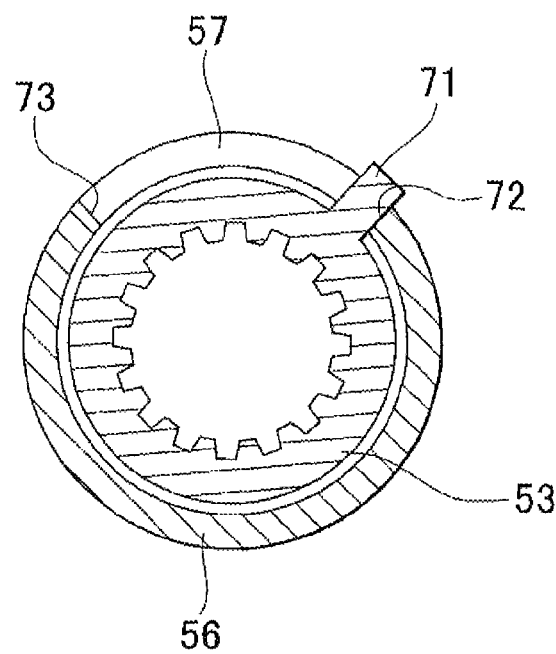
FIG. 7 is a view showing the output shaft when it is forcibly stopped in a normal rotational direction (on a parking range P side) in FIG. 6.
Figure 8:
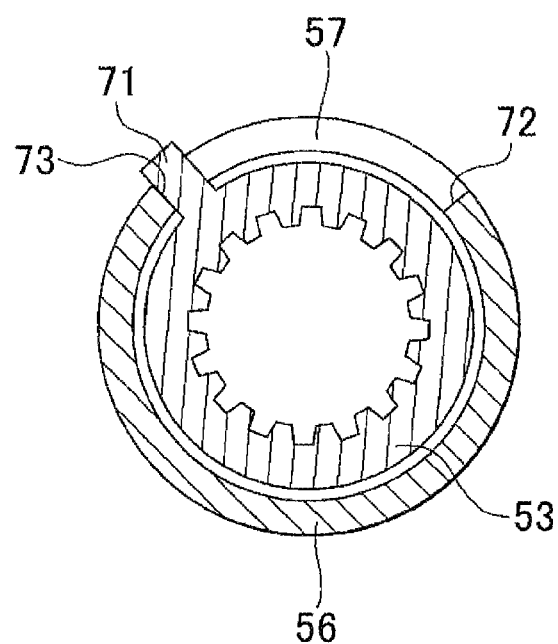
FIG. 8 is a view showing the output shaft when it is forcibly stopped in a reverse rotational direction (on a drive range D side) in FIG. 6.

Thus in the case of this actuator 50, when one lateral face of the protrusion 71 in the circumferential direction thereof abuts the stopper 72 for normal rotation, which is constituted by one wall surface of the axial recess 57, in response to normal rotation of the output shaft 53 as shown in, for example, FIG. 7, the output shaft 53 is forcibly stopped from rotating normally. On the other hand, if the other lateral face of the protrusion 71 in the circumferential direction abuts the stopper 73 for reverse rotation, which is constituted by the other wall surface of the axial recess 57, in response to reverse rotation of the output shaft 53 as shown in, for example, FIG. 8, the output shaft 53 is forcibly stopped from rotating reversely.

Next, an operation will be described.

(a) when the shift range is set to the parking range P, the output shaft 53 of the actuator 50 is normally rotated by a target rotational angle. The target rotational angle in rotating the output shaft 53 to this parking range P is a maximum target rotational angle in one direction.

If the electronic control unit 5 normally performs the operation of controlling the actuator 50, the output shaft 53 stops at a position corresponding to the target rotational angle.

Figure 6:
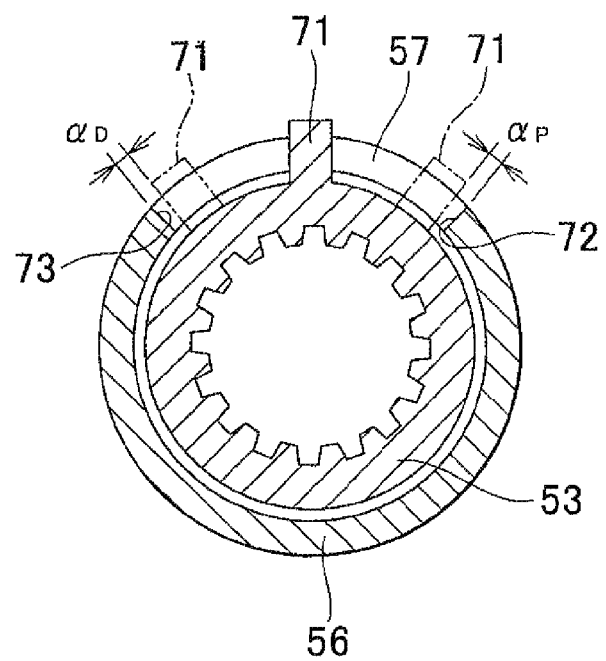
FIG. 6 is a sectional view taken along a line (6)-(6) of FIG. 4, as viewed from the direction of arrows.
Figure 9:
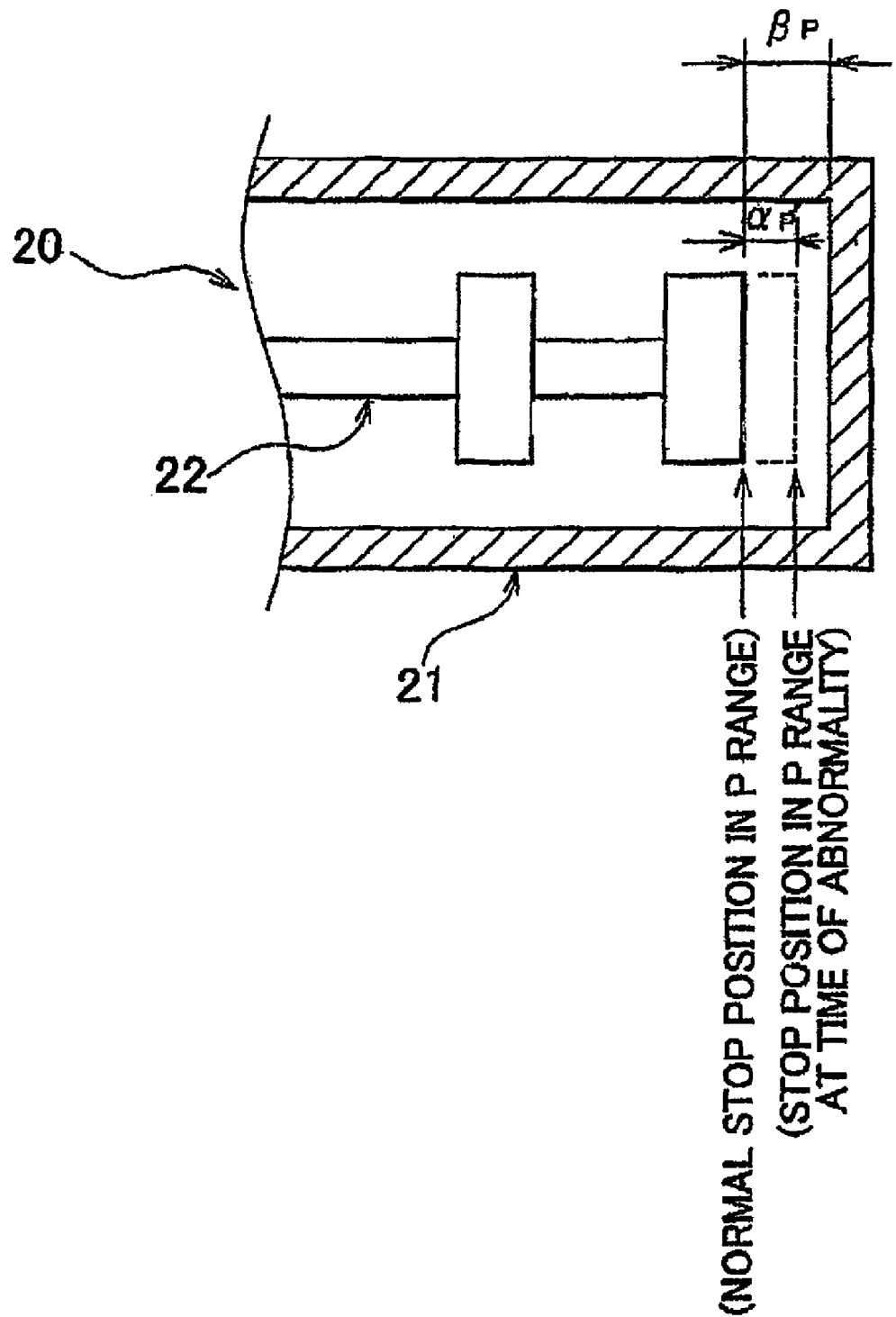
FIG. 9 is a transverse sectional view showing a manual valve of FIG. 1 in a simplified manner, representing a relationship between an inner end of a spool and a back wall of a valve body.

In this normal stop state, as indicated by alternate long and short dash lines of FIG. 6, an extra margin $\alpha_P$ as an appropriate gap is ensured between the protrusion 71 of the output shaft 53 and the stopper 72 for normal rotation. Further, as shown in FIG. 9, an extra margin $\beta_P$ as an appropriate gap is ensured between an inner end of the spool 22 of the manual valve 20 and a back wall inner face of the valve body 21.

The relationship between these extra margins $\alpha_P$ and $\beta_P$ needs to be set such that the inner end of the spool 22 does not interfere with the back wall inner face of the valve body 21 at the time of later-described control abnormality. Thus, a distance $\alpha_P'$ obtained by substituting a moving distance of the spool 22 within the valve body 21 for the extra margin $\alpha_P$ is calculated. When this value is adopted as an extra margin $\alpha_P'$, there needs to be established a relationship: $\alpha_P' < \beta_P$. Therefore, the extra margins $\alpha_P$ and $\beta_P$ are so set as to satisfy this relationship.

However, if the output shaft 53 overruns the target rotational angle due to a cause such as an abnormality in the control of the actuator 50 by the electronic control unit 5 or the like, the protrusion 71 of the output shaft 53 comes into abutment on the stopper 72 for normal rotation as shown in, for example, FIG. 7. As a result, the output shaft 53 is forcibly stopped from rotating normally.

Thus, the detent plate 60, which is in communication with and coupled to the output shaft 53 via the tilt spindle 61, does not tilt more than necessary. Accordingly, the spool 22 of the manual valve 20 and the parking rod 33 of the parking device 30 are both stopped.

When the spool 22 and the parking rod 33 are both stopped, the detent plate 60 is held in a posture close to, for example, a target tilt posture due to an elastic force of the detent spring 65. Therefore, the shift range is held in the parking range P.

If an abnormality in operation occurs as described above, the spool 22 of the manual valve 20 is displaced slightly backward beyond a position corresponding to the parking range P as indicated by broken lines of FIG. 9, but the inner end of the spool 22 does not come into contact with the back wall inner face of the valve body 21 even at that position. In order to ensure this state, the relationship between the extra margins $\alpha_P$ ($\alpha_P'$) and $\beta_P$ is specified as $\alpha_P' < \beta_P$ as described above.

In addition, although not shown, the parking device 30 remains locked. However, in consideration of the fact that the parking rod 33 is displaced slightly more backward than usual, the relationship in relative position between the parking rod 33 and an appropriate component (not shown) in the automatic transmission is appropriately set such that the back end of the parking rod 33 does not come into abutment on the appropriate component in the automatic transmission.

(b) On the other hand, when the shift range is set to the drive range D, the output shaft 53 of the actuator 50 is reversely rotated by the target rotational angle. The target rotational angle in rotating a final reduction gear (not shown) to the drive range D is a maximum target rotational angle in the opposite direction.

If the electronic control unit 5 normally controls the actuator 50, the output shaft 53 stops at an appropriate position where the output shaft 53 is out of contact with the reverse rotation stopper 73.

Normally, when stopped, an extra margin $\alpha_D$ as an appropriate gap is provided between the protrusion 71 of the output shaft 53 and the reverse rotation stopper 73, as indicated by alternate long and two short dashes lines of FIG. 6.

On the drive range D side, an inconvenience as described above, such as the interference of the spool 22 of the manual valve 20 or the like, does not occur. However, there is a possibility that the spool 22 may exit from the valve body 21. Therefore, the extra margin $\alpha_D$ should be so set as to prevent the exit of the spool 22.

However, if the output shaft 53 overruns the target rotational angle as a result of, for example, an abnormality in the control of the actuator 50 by the electronic control unit 5 or the like, the protrusion 71 of the output shaft 53 comes into abutment with the stopper 73 for reverse rotation as shown in, for example, FIG. 6. As a result, the output shaft 53 is prevented from rotating in the opposite direction.

Thus, the detent plate 60, which is in communication with and coupled to the output shaft 53 via the tilt spindle 61, does not tilt more than necessary. Therefore, the spool 22 of the manual valve 20 and the parking rod 33 of the parking device 30 are both stopped.

When the spool 22 and the parking rod 33 are both stopped, the detent plate 60 is held in a posture close to, for example, a target tilt posture due to an elastic force of the detent spring 65. Therefore, the shift range is held in the drive range D.

As described above, in the embodiment of the invention to which the features of the invention are applied, the output shaft 53 of the actuator 50 is structured to allow rotation only within the prescribed rotational angular range.

Thus, even if the rotational angle of the actuator 50 becomes uncontrollable and exceeds the target rotational angle as a result of a failure in the electronic control unit 5, which controls the actuator 50, the rotational angle limiting unit (the protrusion 71 and the stoppers 72 and 73) forcibly stop the output shaft 53 of the actuator 50 from rotating more than necessary.

Accordingly, even in the event of, for example, a control abnormality that causes the actuator 50 to overrun, the detent plate 60 is prevented from being tilted more than necessary. Therefore, for example, excessive movement of the spool 22 of the manual valve 20, which results in interfere with the back wall of the valve body 21, or excessive movement of the parking rod 33 of the parking device 30, which results in interfere with an appropriate component (not shown) in the automatic transmission, may be avoided.

Furthermore, the rotational angle limiting unit is designed such that the protrusion 71 and both the stoppers 72 and 73 are provided at the position that is furthest downstream of a power transmission path from the rotational power generating portion 51 of the actuator 50 to the output shaft 53. Therefore, play in the rotational angle (backlash or the like of a meshing portion due to the tolerances of parts constituting the speed reduction mechanism 52 or the accuracy in assembling the speed reduction mechanism 52) inherent in the power transmission path is grasped in advance, and the target rotational angle of the output shaft 53 is set to compensate for the play. Thus, play is prevented from being transmitted from the output shaft 53 to the tilt spindle 61 of the detent plate 60, and an advantage is gained in reducing the dispersion of the range of the rotational angle limited by the rotational angle limiting unit (71, 72, 73).

For reference, if the rotational angle limiting unit (71, 72, 73) is provided in the power transmission path upstream from the rotational power generating portion 51 of the actuator 50 to the output shaft 53, the play of rotational angle inherent in the power transmission path cannot be removed on the actuator 50 side and hence is transmitted from the output shaft 53 to the tilt spindle 61 of the detent plate 60. Thus, it is possible that the accuracy in controlling the rotational angle of the tilt spindle 61 nay deteriorate.

In addition, the protrusion 71 is integrally provided on the output shaft 53, and both the stoppers 72 and 73 are integrally provided on the tubular boss portion 56 of the casing 54 of the actuator 50. Therefore, the process of assembling the rotational angle limiting unit (71, 72, 73) is not required. Thus, there is no accumulation of errors in the process of assembly. In short, only manufacturing tolerances of the output shaft 53, the casing 54, and the like constitute a factor in determining the accuracy of the range of the rotational angle limited by the rotational angle limiting unit (71, 72, 73). Therefore, the accuracy of the rotational angle limiting range of the output shaft 53 may be maximized.

Figure 10:
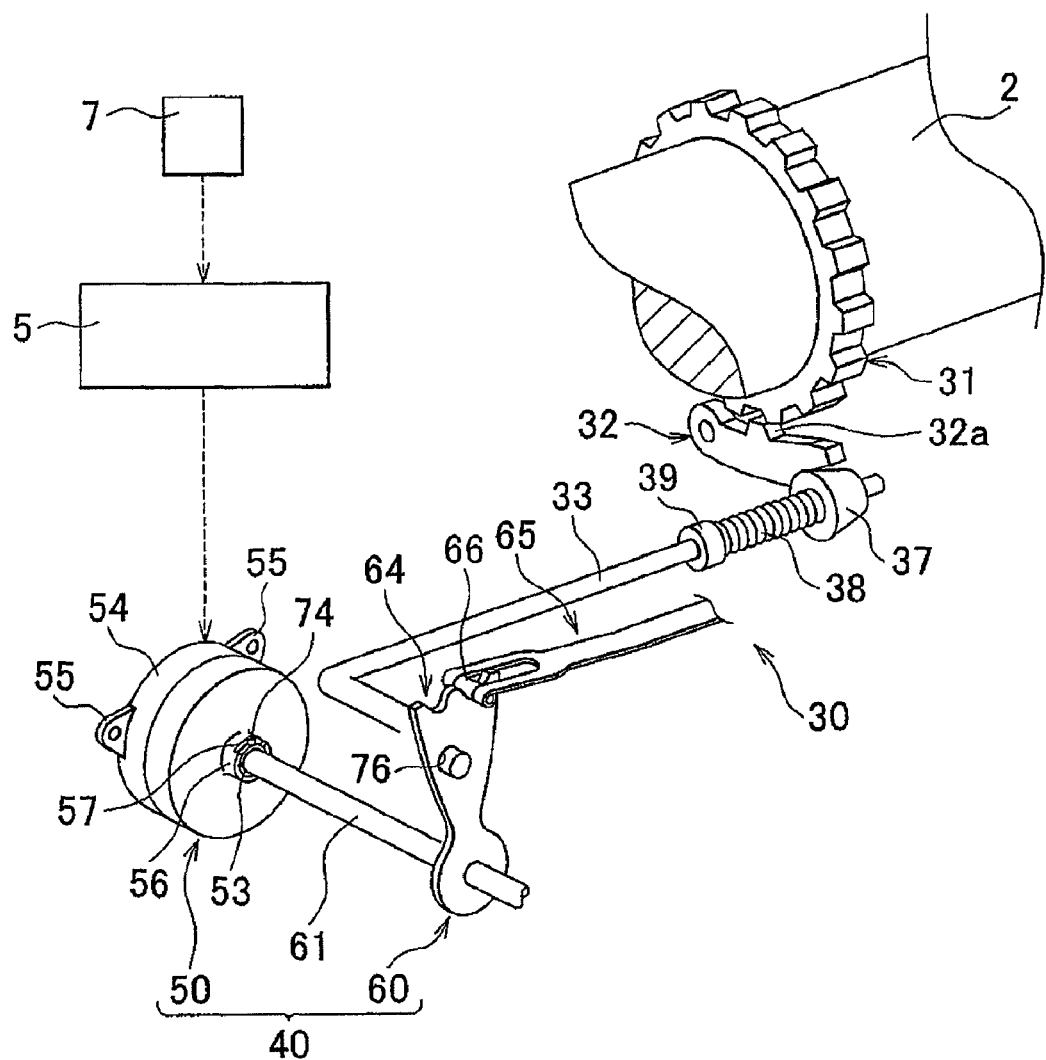
FIG. 10 is a perspective view showing the overall structure of one embodiment of a parking device according to the invention.
Figure 11:
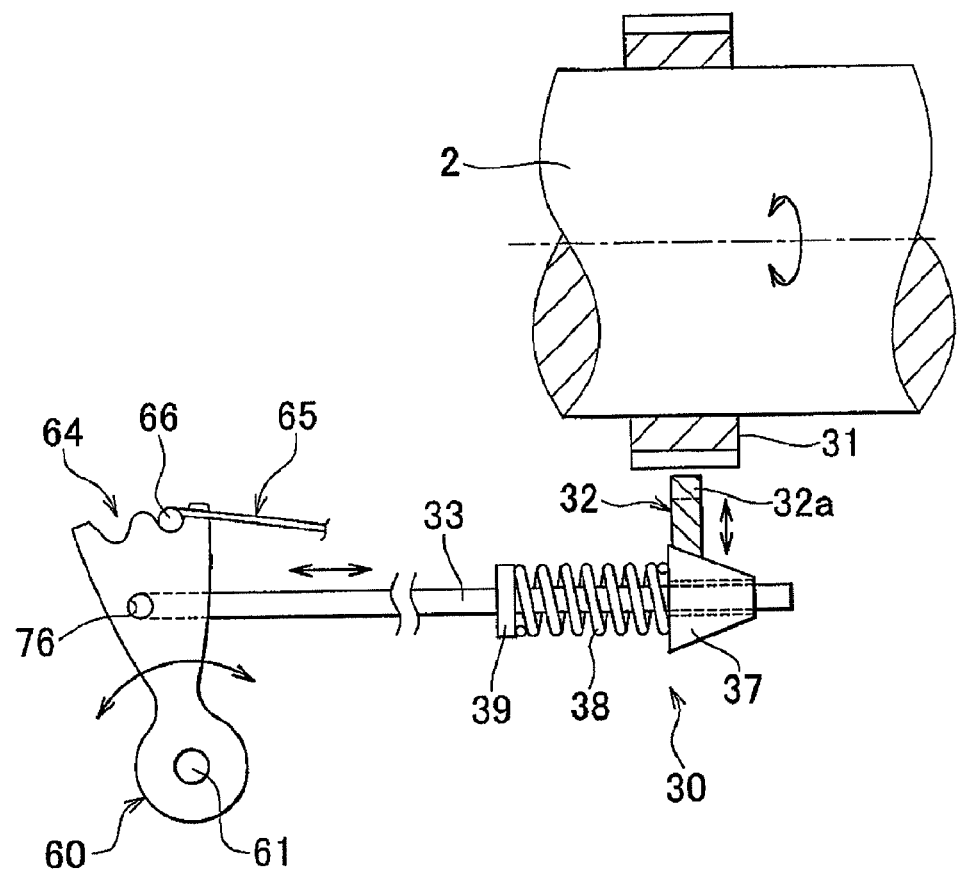
FIG. 11 is a lateral view of the parking device of FIG. 10 when the parking device is unlocked.

Next, one embodiment of the parking device 30 according to the invention will be described in detail with reference to FIGS. 10 and 11.

In short, the parking device 30 according to this embodiment of the invention is constructed by eliminating the manual valve 20 for range changeover for the automatic transmission in the aforementioned range changeover device 10 and reducing the number of the troughs of the waveform portion 64 for positioning, which is provided as part of the detent plate 60, to two.

As described above, the parking device 30 is mainly composed of the parking gear 31, the parking lock pawl 32, the parking rod 33, and the drive unit 40 (the actuator 50 and the detent plate 60).

The drive unit 40 of the parking device 30 is electrically controlled by the electronic control unit (ECU) 5 in response to the operation of a parking operation member 7, for example, a parking button or the like. Although not shown, the base end of the detent spring 65 is fitted to a stationary object, for example, the automatic transmission case 3 or the like.

The basic operation of the parking device 30 thus constructed will be described.

First, when the parking operation member 7 is operated to select the parking lock, a parking lock signal is output from the parking operation member 7 to the electronic control unit 5. The electronic control unit 5 drives the actuator 50 in response to the parking lock signal, thereby rotating the output shaft 53 and the tilt spindle 61 in a lock direction, for example, the positive rotational direction by a predetermined angle.

Thus, the detent plate 60 tilts together with the tilt spindle 61 in the same direction as described above, and the parking rod 33 is pushed toward the back end of the parking rod 33 in accordance with the tilting of the detent plate 60. Then, a large-diameter side of the tapered cone 37 pushes the parking lock pawl 32 upward, and the pawl tooth 32a of the parking lock pawl 32 is engaged in a space between adjacent teeth of the parking gear 31. Thus, the output shaft 2 of the automatic transmission is locked to prevent rotation of the output shaft 2.

However, if the driver operates the parking operation member 7 out of the P range, a parking cancellation signal is output from the parking operation member 7 to the electronic control unit 5. The electronic control unit 5 drives the actuator 50 in response to the parking cancellation signal, and thereby rotates the output shaft 53 and the tilt spindle 61 in an anti-lock direction, for example, the reverse rotational direction, by a predetermined angle.

Thus, the detent plate 60 tilts together with the tilt spindle 61 in the same direction as described above, and the parking rod 33 and the tapered cone 37 are pulled toward the back end of the parking rod 33 in accordance with the tilting of the detent plate 60. As a result, the force exerted by the tapered cone 37 to push the parking lock pawl 32 upward is canceled. Therefore, the parking lock pawl 32 moves downward, and the pawl tooth 32a of the parking lock pawl 32 is withdrawn from the space between adjacent teeth of the parking gear 31. Thus, the output shaft 2 is unlocked and may rotate.

When the output shaft 2 is locked or unlocked, the roller 66 of the detent spring 65 is engaged with the appropriate groove of the detent plate 60. Thus, the detent plate 60 is held in posture and position.

As is the case with the actuator 50 of the range changeover device 10, the actuator 50 of the parking device 30 as described above includes the rotational angle limiting unit (including the protrusion 71 and the stoppers 72 and 73) provided between the output shaft 53 and the casing 54. Any redundant description or detailed illustration of this construction is omitted.

That is, in the parking device 30 constructed as described above, even if the actuator 50 is about to overrun due to a failure in the electronic control unit 5 of the actuator 50, the rotational angle limiting unit (including the protrusion 71 and the stoppers 72 and 73) can stop the output shaft 53 of the actuator 50 from excessive rotation.

Thus, no driving force is transmitted from the actuator 50 to the detent plate 60. Therefore, the detent plate 60 is prevented from being tilted more than necessary. Accordingly, the parking rod 33 of the parking device 30 is not displaced more than necessary. Therefore, the occurrence of an undesirable situation where the parking rod 33 interferes with an appropriate one of the components (not shown) in the automatic transmission is prevented.

The invention is not limited to the foregoing embodiment, but includes all modifications and applications encompassed in the scope of the claims and a scope equivalent thereto are possible. Other embodiments of the invention are described below.

(1) The range changeover device 10 and the parking device 30, which have been described in the foregoing embodiment of the invention, are used after being incorporated into an automatic transmission of front engine, rear drive (FR) type, front engine, front drive (FF) type, or the like. The automatic transmission is not limited to a multi-staged automatic transmission or a continuously variable automatic transmission. In addition, the range changeover device 10 and the parking device 30 may be incorporated into a manual transmission, which does not employ a torque converter, as well as an automatic transmission.

(2) The foregoing embodiment of the invention cites the example in which the output shaft 53 of the actuator 50 and the tilt spindle 61 of the detent plate 60 are integrally rotatably coupled to each other through spline fitting.

An alternative mode of coupling, for example, the contour of the tilt spindle 61 on the axial outer end side thereof and the cross-section of the transverse hole region of the output shaft 53 may be formed in an oval shape, a square shape, a triangular shape, or the like so that the tilt spindle 61 and the output shaft 53 can be fitted to each other. The oval shape refers to the shape of a playing ground obtained by connecting two rectilinear portions and two semicircles together.

In this manner as well, the output shaft 53 of the actuator 50 may be coupled to the tilt spindle 61 of the detent plate 60 so that the output shaft 53 is integrally rotatable and axially displaceable with the tilt spindle 61.

(3) In the foregoing embodiment of the invention, the protrusion 71 provided on the output shaft 53 of the actuator 50 may be a member separate from the output shaft 53.

Figure 12:
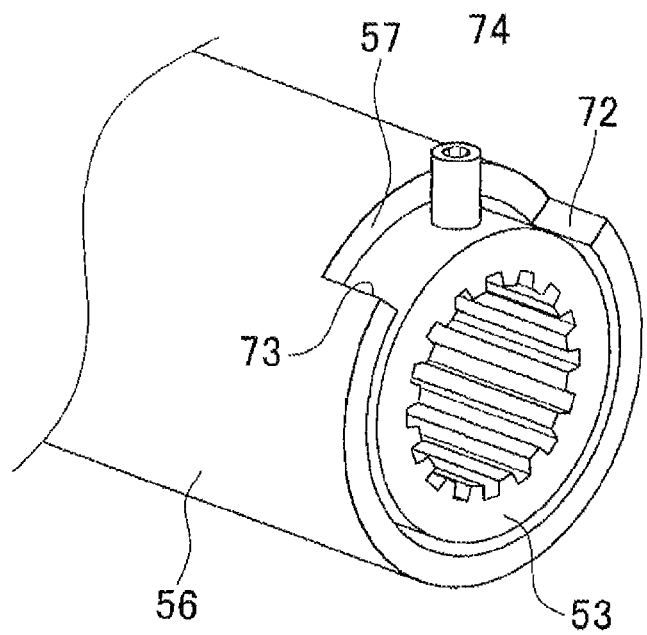
FIG. 12 is a view corresponding to FIG. 5, showing another embodiment of a coupling region between an output shaft and a tilt spindle of a detent plate in an actuator according to the invention.
Figure 13:
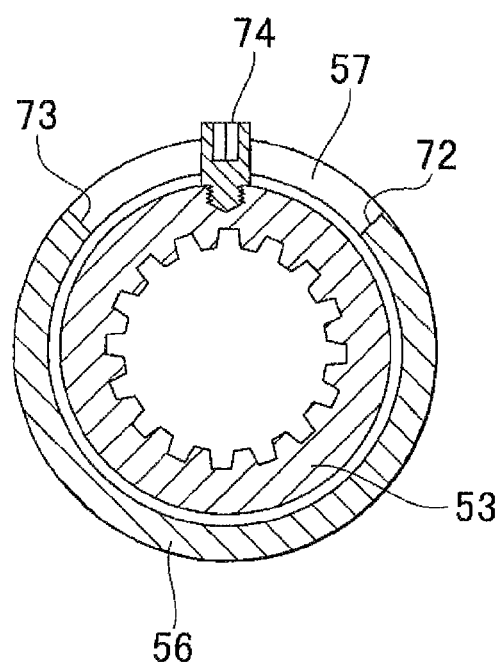
FIG. 13 is a view corresponding to FIG. 6 in the embodiment of the invention shown in FIG. 12.

A hexagon socket head bolt 74 as shown in, for example, FIGS. 12 and 13 may be used instead of the protrusion 71, and the hexagon socket head bolt 74 may be screwed onto the output shaft 53 via a threaded portion.

However, when the contour of a head portion assumes a circular shape, as in the case of the hexagon socket head bolt 74, the gap between the head portion of the hexagon socket head bolt 74 and each of both the stoppers 72 and 73 remains constant regardless of the screwed state of the hexagon socket head bolt 74. Therefore, the rotational angle limiting range of the output shaft 53 may be held constant.

In the structure shown in this embodiment of the invention as well, an operation and an effect that are basically similar to those of the foregoing embodiment of the invention are obtained. However, one effect that is peculiar to this embodiment of the invention is that the operation of assembling the actuator 50 is relatively easy because of the output shaft 53 and the hexagon socket head bolt 74 that are designed as separate members.

(4) In the foregoing embodiment of the invention, although not shown, a shock absorbing member can be added to each of both the stoppers 72 and 73. In that case, the protrusion 71 or the hexagon socket head bolt 74 comes into abutment on the shock absorbing member instead of directly coming into abutment on one of the stoppers 72 and 73 at the time of forcible stoppage of the output shaft 53. Therefore, the impact and sound at the time of abutment can be absorbed and damped. An appropriate shock absorbing member may be selected from, for example, a synthetic resin maternal, a foamed material, or the like, which exhibits appropriate elasticity.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An actuator for a state changeover element whose state changes over by being rectilinearly pushed or pulled in cooperation with tilting of a tilt member, comprising:
    a rotational power generating portion;
    an output shaft, that is disposed coaxial with and integrally rotatably coupled to a tilt spindle of the tilt member, through which rotational power generated by the rotational power generating portion is output;
    a casing that covers the actuator and includes an opening through which one axial end of the output shaft is exposed; and
    a rotational angle limiting unit, provided radially between the output shaft and a wall portion of the casing, that faces the output shaft and physically limits a rotational angle of the output shaft,
    wherein the rotational angle limiting unit includes a protrusion, provided on the output shaft, that radially protrudes toward a wall portion of the casing, and stoppers provided on the wall portion of the casing, that abut against the protrusion as the output shaft rotates, the wall portion of the casing is a tubular boss portion through which the output shaft is disposed, the stoppers provided on the tubular boss portion, and the stoppers are wall surfaces located at each side, in a circumferential direction, of an axial recess provided within a predetermined angular range in the circumferential direction in the tubular boss portion.

2. The actuator according to claim 1, wherein the protrusion is provided as a separate member from the output shaft, and is screwed to the output shaft.

3. The actuator according to claim 1, wherein at least one of the stoppers has a shock absorbing member added thereto.

4. An actuator for a state changeover element whose state changes over by being rectilinearly pushed or pulled in cooperation with tilting of a tilt member, comprising:
    a rotational power generating portion;
    an output shaft, that is disposed coaxial with and integrally rotatably coupled to a tilt spindle of the tilt member, through which rotational power generated by the rotational power generating portion is output;
    a casing that covers the actuator and includes an opening through which one axial end of the output shaft is exposed; and
    a rotational angle limiting unit, provided radially between the output shaft and a wall portion of the casing, that faces the output shaft and physically limits a rotational angle of the output shaft,
    wherein the output shaft has a female spline to which the tilt spindle is spline-fitted, the wall portion of the casing is a tubular boss portion through which the output shaft is disposed in a non-contact manner, the rotational angle limiting unit includes a protrusion, provided on an outer periphery of the output shaft at the end of the output shaft that is coupled to the tilt spindle, that protrudes radially outward, and stoppers provided on the tubular boss portion, that abut against the protrusion as the output shaft rotates, and the stoppers are wall surfaces located at each side, in a circumferential direction, of an axial recess provided within a predetermined angular range in the circumferential direction in the tubular boss portion.

5. A range changeover device for an automatic transmission equipped with the actuator according to claim 4, further comprising:
    a shift operation unit that is operated to select a shift range;
    a shift range position detector that detects the shift range position selected by the shift operation unit;
    a drive unit that changes a state of a manual valve of a hydraulic control unit for shift range changeover, with which the automatic transmission is equipped, based on the shift range detected by the shift range position detector, wherein
    the drive unit includes the tilt member that is rotatably supported, and is rotated to change the state of the manual valve, and the actuator that rotates the tilt spindle of the tilt member.

6. A parking device equipped with the actuator according to claim 4, further comprising:
   a parking gear that is fixed to the exterior of an output shaft of a transmission;
   a parking lock pawl that has a pawl tooth that engages with the parking gear and is displaced between a locked position, in which the parking gear is unrotatable, when the parking lock pawl approaches the parking gear to engage the pawl tooth with the parking gear, and an unlocked position, in which the parking gear is rotatable, when the parking lock pawl moves away from the parking gear to disengage the pawl tooth from the parking gear;
   a parking rod that is actuated to engage and disengage the parking lock pawl with the parking gear;
   a drive unit that actuates the parking rod, wherein the drive unit includes the tilt member that is tiltably supported to actuate the parking rod, and the actuator that rotates the tilt spindle of the tilt member.

7. The actuator according to claim 4, wherein the protrusion is provided as a separate member from the output shaft, and is screwed to the output shaft.

8. The actuator according to claim 4, wherein at least one of the stoppers has a shock absorbing member added thereto.

9. A range changeover device for an automatic transmission equipped with the actuator according to claim 4, further comprising:
   a shift operation unit that is operated to select a shift range;
   a shift range position detector that detects the shift range position selected by the shift operation unit;
   a drive unit that changes a state of a manual valve of a hydraulic control unit for shift range changeover, with which the automatic transmission is equipped, based on the shift range detected by the shift range position detector, wherein the drive unit includes the tilt member that is rotatably supported, and is rotated to change the state of the manual valve, and the actuator that rotates the tilt spindle of the tilt member.

10. A parking device equipped with the actuator according to claim 4, further comprising:
    a parking gear that is fixed to the exterior of an output shaft of a transmission;
    a parking lock pawl that has a pawl tooth that engages with the parking gear and is displaced between a locked position, in which the parking gear is unrotatable when the parking lock pawl approaches the parking gear to engage the pawl tooth with the parking gear, and an unlocked position, in which the parking gear is rotatable when the parking lock pawl moves away from the parking gear to disengage the pawl tooth from the parking gear;
    a parking rod that is actuated to engage and disengage the parking lock pawl with the parking gear;
    a drive unit that actuates the parking rod, wherein
    the drive unit includes the tilt member that is tiltably supported to actuate the parking rod, and the actuator that rotates the tilt spindle of the tilt member.

11. A range changeover device for an automatic transmission equipped with the actuator according to claim 4, further comprising:
    a shift operation unit that is operated to select a shift range;
    a shift range position detector that detects the shift range position selected by the shift operation unit;
    a drive unit that changes a state of a manual valve of a hydraulic control unit for shift range changeover, with which the automatic transmission is equipped, based on the shift range detected by the shift range position detector, wherein
    the drive unit includes the tilt member that is rotatably supported, and is rotated to change the state of the manual valve, and the actuator that rotates the tilt spindle of the tilt member.

12. A parking device equipped with the actuator according to claim 4, further comprising:
    a parking gear that is fixed to an exterior of an output shaft of a transmission;
    a parking lock pawl that has a pawl tooth that engages with the parking gear and is displaced between a locked position, in which the parking gear is unrotatable, when the parking lock pawl approaches the parking gear to engage the pawl tooth with the parking gear, and an unlocked position, in which the parking gear is rotatable, when the parking lock pawl moves away from the parking gear to disengage the pawl tooth from the parking gear;
    a parking rod that is actuated to engage and disengage the parking lock pawl with the parking gear;
    a drive unit that actuate the parking rod, wherein the drive unit includes the tilt member that is tiltably supported to actuate the parking rod, and the actuator that rotates the tilt spindle of the tilt member.

* * * * *